patented Dec. 25, 1956

2,775,591

ALCOHOL-AMINE COMPLEXES

W E Craig, Philadelphia, Pa., and Harold F. Wilson, Moorestown, N. J., assignors to Rohm & Haas Company, Philadelphia, Pa., a corporation of Delaware No Drawing. Application June 17, 1954,
Serial No. 437,571

7 Claims. (Cl. 260—247.7)

This invention deals with complexes of α-dichloromethylbenzhydrols and heterocyclic amines having dissociation constants less than $10^{-5}$ and greater than about $10^{-11}$, in which these compounds are bound in a 1:1 mole ratio.

Alcohol-amine complexes do not appear to have been isolated heretofore. Yet in the case of benzhydrols having an α-dichloromethyl substituent, we have found that such complexes do in fact exist and can be isolated and identified.

The benzhydrolys which can be thus complexed have the general structure

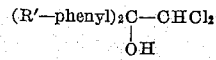

where R' is hydrogen, fluorine, chlorine, bromine, or alkyl, alkyl groups of not over four carbon atoms being preferred. One convenient way of preparing these benzhydrols is to start with a compound (R'-phenyl)$_2$CHCHCl$_2$, dehydrohalogenate it to (R'phenyl)$_2$C=CHCl, chlorinate this compound to (R'phenyl)$_2$CClCHCl$_2$, and react this last compound with water in the presence of acetic or formic acid at 100° to 125° C. until hydrogen chloride is no longer evolved.

Preparation of the starting bisphenyldichloroethanes is described in U. S. Patent No. 2,464,600. Useful bisphenyldichloroethanes include the diphenyl, bis(4-chlorophenyl)-, bis(4-fluorophenyl)-, bis(4-bromophenyl)-, bis-(dichlorophenyl)-, bis(methylchlorophenyl)-, ditolyl, bis-(ethylphenyl)-, bis(butylphenyl)-, bis(chloroisopropylphenyl)-, etc. derivatives. There may be used a single isomer or a mixture of isomers.

Dehydrohalogenation of these compounds can be accomplished by heating a said compound with sodium or potassium hydroxide in an alcohol such as methanol, ethanol, butanol, or isopropyl alcohol, at 60° to 125° C. Excess alkali and the salt formed are washed away with water and the ethylenic compound is obtained upon stripping.

The ethylenic compound is now chlorinated either in bulk or, better, in solution. As solvents, carbon tetrachloride, ethylene dichloride, tert-butyl alcohol, or acetic acid may be used. Chlorine is passed in at 20° to 75° C. until the theoretical amount has been taken up. The reaction mixture is washed with water, solvent is removed, and the product of the formula (R'phenyl)$_2$CClCHCl$_2$ is separated.

A compound of this formula is heated with aqueous formic or acetic acid between 100° and 125°, preferably 105° to 118° C. with conversion to the desired α-dichloromethylbenzhydrol. When acetic acid is used, crystals of the benzhydrol often separate when the reaction mixture is cooled and may be separated and washed with water. The product here may also be isolated by washing the reaction mixture with water several times and with a solution of sodium bicarbonate or carbonate.

The formic acid may be used at 50% to 95% concentration, preferably 70% to 90%. Acetic acid is used at similar concentrations and again, desirably at 70% to 90%. These acids are used in excess and carry more than sufficient water to provide the desired OH group in the bisphenyldichloroethane structure.

A typical preparation of a benzhydrol useful for forming the alcohol-amine complexes of this invention will now be described. Parts shown are by weight.

PREPARATION A

There are mixed 355 parts of 1,1-bis(chlorophenyl)-1,2,2-trichloroethane (made from technical

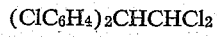

wherein the chlorine on the phenyl nucleus is largely para) and 500 parts of aqueous 90% formic acid. The mixture is heated and stirred with the temperature being carried to 105°–115° C. for a period of four hours. Fumes of hydrogen chloride are then no longer evolved. The reaction mixture is cooled below 90° C. and treated with 500 parts of water. Benzene is added and the benzene layer is washed with dilute sodium carbonate solution and water. The benzene is distilled off to yield an oil, which is crystallized from isooctane. The crystals melt at 105° C. In a mixed melting point determination with an authentic sample of the desired benzhydrol there is no depression. The product is α-dichloromethyl-4,4'-dichlorobenzhydrol. The yield is well over 70%.

This same procedure is advantageously applied to other bis(phenyl)trichloroethanes, such as the bis(fluorophenyl)-trichloroethane, bis(bromophenyl)trichloroethane, or bis-(alkylphenyl)trichloroethanes. In each case the corresponding α-dichloromethyl disubstituted benzhydrol is formed in good yield. For example, α-dichloromethyl-4,4'-dimethylbenzhydrol and α-dichloromethyl-4,4'-diethylbenzhydrol as obtained are oils.

As amines for preparing the alcohol-amine complexes of this invention there are used heterocyclic amines having an intermediate range of base strength as defined by the range between $10^{-5}$ and $10^{-11}$. More basic amines, it is interesting to note, form amine hydrochlorides. Weaker amines fail to react. Complexes have, however, been successfully formed from such heterocyclics as morpholine with a dissociation constant of $8 \times 10^{-6}$, nicotine $(7 \times 10^{-7})$, the picolines, lutidines, and collidines, the ethylpyridines, pyridine $(2 \times 10^{-9})$, quinoline $(6 \times 10^{-10})$, isoquinoline, and also benzoxazole, and benzothiazole. As will be noted, most of the useful amines have a pyridine cycle and in fact the complexes formed therewith are of most interest.

To prepare the alcohol-amine complexes a defined benzhydrol and a defined heterocyclic amine are mixed. This is best done in an inert organic solvent such as methanol, ethanol, isopropyl alcohol, dioxane, acetone, methyl ethyl ketone, naphtha, aromatic hydrocarbon, acetonitrile, or nitromethane, or a mixture of solvents. The mixture is warmed to facilitate solution of benzhydrol or amine or both. The mixture is cooled and a solid product usually crystallizes. Petroleum ether and alcohols are particularly suitable for permitting isolation of product in this way. Occasionally the product is an oil, as with nicotine, and the product can then be obtained by decanting and stripping.

Exact proportions of reactants are not necessary. It is generally convenient to use excess of heterocyclic amine. Even so, a complex with a 1:1 mole ratio of benzhydrol to amine forms.

The exact nature of this complex is difficult to elucidate, but complex formation undoubtedly involves bonding between the hydroxy hydrogen and the nitrogen. This bonding is in part controlled by the particular structure of the benzhydrol and of the amine. For example if the α-chloromethyl group is replaced by hydrogen, $CH_3—$, or $CCl_3$, no complex is obtained. On the other hand, complexes result when the α-substituent is ethynyl or p-chlorophenyl. With respect to amines, complexes fail to form with piperidine, benzyl amine, aniline, and many other amines.

Details of typical preparations of complexes of this invention are given in the following illustrative examples, wherein parts are by weight.

*Example 1*

There are mixed 46 parts of α-dichloromethyl-4,4'-dichlorobenzhydrol, 40 parts of benzene-denatured ethanol, and 12 parts of pyridine. This mixture is heated under reflux for an hour. It is cooled. Crystals form, are filtered off, and dried to give 48 parts of product. By analysis it contains 33.9% of chlorine and 3.4% of nitrogen. Theoretical values for $C_{19}H_{15}Cl_4NO$ are 34.1% for chlorine and 3.37% for nitrogen. The product obtained is, thus, the complex of one mole of the benzhydrol and one mole of the amine. It melts at 101°–103.5° C.

In similar manner, any of the other α-dichloromethylbenzhydrols defined above can be reacted with pyridine to form a 1:1 addition complex.

*Example 2*

There are mixed 33.6 parts of α-dichloromethyl-4,4'-dichlorobenzhydrol and 44.2 parts of pyridine. This mixture is heated on a steam bath for 30 minutes and then cooled. A solid separates. It is filtered off, washed with octane, and dried. It corresponds to the 1:1 complex of α-dichloromethyl-4,4'-dichlorobenzhydrol and pyridine. A mixed melting point with the product of Example 1 shows no depression.

*Example 3*

A solution is prepared from 34 parts of α-dichloromethyl-4,4'-dichlorobenzhydrol and 80 parts of octane by heating to 90°–95° C. Addition is made of 13 parts of quinoline. The mixture is heated at 90°–100° C. for 1.5 hours and cooled. Crystals form, are collected, and are dried. They amount to 44 parts. By analysis they contain 29.7% of chlorine and 3.1% of nitrogen. Theoretical values for the 1:1 complex of the benzhydrol and amine are 30.4% and 3.01% respectively. The melting point is 97°–98.5° C.

This method applied to other defined α-dichloromethylbenzhydrols yields similar quinoline complexes, all having the 1:1 mole ratio which has been shown above.

*Example 4*

There are mixed 10 parts of α-picoline, 34 parts of α-dichloromethyl-4,4'-dichlorobenzhydrol, and 80 parts of octane. The mixture is heated at 90°–95° C. for five hours. After the reaction mixture is cooled, a white crystalline material separates in 93% yield of the 1:1 complex. It melts at 64°–66° C. By analysis the product contains 33.4% of chlorine and 3.1% of nitrogen (theory 33.0% and 3.3% respectively).

Substitution of α-dichloromethylbenzhydrol itself yields a 1:1 complex with picolines, lutidenes, or collidines. Likewise, the 1:1 complex is obtained from α-dichloromethyl-4,4'-diethylbenzhydrol or α-dichloromethyl-4,4'-difluorobenzhydrol or α-dichloromethyl-4,4'-dibromobenzhydrol. In every case the 1:1 complex is formed.

*Example 5*

A solution is prepared from 34 parts of α-dichloromethyl-4,4'-dichlorobenzhydrol and 80 parts of octane by heating the mixture thereof on a steam bath. The solution is treated with 18 parts of nicotine and heated for four hours at 90° C. The solution is cooled. An oil settles out. Supernatant liquor is poured off and the oil is dissolved in hot octane. The resulting solution is cooled. Again, an oil settles out. The solvent and oil are separated. The oil is subjected to stripping under low pressure with heating on a steam bath. The dark oily residue is chiefly the 1:1 complex of the benzhydrol and nicotine.

Similar oils are obtained by bringing together nicotine and the other α-dichloromethylbenzhydrols defined above.

*Example 6*

There are mixed 34 parts of α-dichloromethyl-4,4'-dichlorobenzhydrol, 10 parts of morpholine, and 80 parts of octane. The mixture is heated on a steam bath and then cooled. White crystals in an amount of 38 parts are separated. They melt at 104°–107° C. By analysis they contain 33.9% of chlorine and 3.0% of nitrogen. Theory for the 1:1 complex requires 33.4% of chlorine and 3.3% of nitrogen.

*Example 7*

A solution of 34 parts of α-dichloromethyl-4,4'-dichlorobenzhydrol in 80 parts of octane is heated on a steam bath and treated with 15 parts of benzothiazole. This mixture is heated at 90° C. for five hours and cooled. A grayish solid forms and is filtered off. It is recrystalized from octane to give 44 parts of the 1:1 complex of α-dichloromethyl-4,4'-dichlorobenzhydrol. It melts at 88°–90° C. It contains by analysis 30.5% of chlorine, 2.8% of nitrogen, and 6.5% of sulfur. Corresponding theoretical values are 30.2%, 2.96% and 6.8% respectively.

*Example 8*

A solution is prepared by heating 80 parts of octane and 34 parts of α-dichloromethyl-4,4'-dichlorobenzhydrol. Addition is made of 13 parts of benzoxazole and the mixture is heated at 90°–95° C. for five hours. The reaction mixture is cooled. An oil settles out. It is collected and dissolved in an octane-benzene mixture. When this solution is chilled a solid deposits in an amount of 36.5 parts. It melts at 76.5°–79° C. and corresponds fairly closely in composition to the 1:1 complex of the starting materials.

The α-dichloromethylbenzhydrol - heterocyclic amine complexes are useful as pesticides. They have the desirable property of being readily formulated in wettable powders, emulsion concentrates, solutions, and sprays. For example, a wettable powder is prepared by mixing together 72 parts of a finely particled clay, two parts of a naphthalene-formaldehyde condensate sodium sulfonate, one part of a wetting agent such as an octylphenoxypolyethoxyethanol, and 25 parts of one of the above complexes. Such a wettable powder may be taken up in water and applied in a spray. It may be extended with additional solid carrier to give a dust.

An emulsifiable concentrate may be made by dissolving a complex of this invention in an inert solvent, such as an aromatic hydrocarbon, along with a solvent-soluble emulsifying agent. A typical formulation comprises 25 parts of a complex of this invention dissolved in 71 parts of methylated naphthalene solvents to which four parts are added of a good emulsifier. A suitable emulsifier is composed, for example, of the ethylene oxide condensate of methylene bis(diamylphenol) and a condensate of polyglycerol, oleic acid, and a minor proportion of phthalic acid.

Some typical test data will be summarized here. Against red spiders the complex of Example 3 gave a kill at 1:6,400 of 100% and at 1:12,800 of 95%. Against bean beetle larvae a dust containing 10% of this complex killed 83% of the larvae in 24 hours. This complex was found to be an effective ovicide, giving a kill of mite eggs of 87% when applied at 1:6,400. This is a higher kill than an equivalent concentration of the α-dichloromethyldichlorobenzhydrol gives.

The nicotine complexes of the various benzhydrols are highly effective against various types of pests. For example, a 10% dust gave a kill of aphids of 87%. A 1% solution in a fly spray gave kills from 72%–88% of flies. A spray containing 1 part of the complex in 3200 parts of spray gave a 100% kill of red spider and a 95% kill of mite eggs.

The morpholine complex of α-dichloromethyl-4,4'-dichlorobenzhydrol gave 96% kills of red spider at 1:1600 and 1:3200 dilution and a 90% kill of mite eggs at 1:1600.

The pyridine complex of α-dichloromethyl-4,4'-dichlorobenzhydrol gave kills of 100% of red spider from sprays at 1:800, 1:1600, and 1:6400, and kills of mite eggs from 83% at 1:800 and 77% at 1:1600. Substitution of methylated pyridines for pyridine itself in the complexes gives substantially the same kills. The kill of mite eggs with the α-picoline complex of Example 4 was 92% at 1:800.

The benzoxazole complex of Example 8 gave kills of army worm of 93% applied at 1:800 in spray from either an emulsifiable concentrate or wettable powder. The kill was still 90% from spray with wettable powder giving a dilution of complex of 1:1600. The benzothiazole complex is also a powerful pesticide.

We claim:

1. As a composition of matter, the equimolecular complex of a heterocyclic amine from the class consisting of morpholine, nicotine, picoline, lutidine, collidine, ethylpyridine, pyridine, quinoline, isoquinoline, benzoxazole, and benzothiazole and a compound of the formula $$(R'\text{phenyl})_2\underset{\underset{\text{OH}}{|}}{C}-CHCl_2$$

where R' is a member of the class consisting of hydrogen, fluorine, chlorine, bromine, and alkyl groups of not over four carbon atoms.

2. As a composition of matter, the equimolecular complex of α-dichloromethyldichlorobenzhydrol and a heterocyclic amine from the class consisting of morpholine, nicotine, picoline, lutidine, collidine, ethylpyridine, pyridine, quinoline, isoquinoline, benzoxazole, and benzothiazole.

3. The complex of claim 2 wherein the amine is pyridine.

4. The complex of claim 2 wherein the amine is nicotine.

5. The complex of claim 2 wherein the amine is quinoline.

6. The complex of claim 2 wherein the amine is benzoxazole.

7. The complex of claim 2 wherein the amine is α-picoline.

References Cited in the file of this patent

J. Econom. Entomology, vol. 41, pp. 895–900 (1948).